United States Patent
Koc et al.

(10) Patent No.: US 9,621,209 B2
(45) Date of Patent: Apr. 11, 2017

(54) USE OF SCHEDULING REQUEST AND RANDOM ACCESS FOR LTE ADVANCED NETWORKS

(71) Applicant: Intel Corporation, Santa Clara, CA (US)

(72) Inventors: Ali T. Koc, Portland, OR (US); Maruti Gupta, Portland, OR (US); Satish C. Jha, Hillsboro, OR (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/440,430

(22) PCT Filed: Dec. 3, 2013

(86) PCT No.: PCT/US2013/072886
§ 371 (c)(1),
(2) Date: May 4, 2015

(87) PCT Pub. No.: WO2014/089090
PCT Pub. Date: Jun. 12, 2014

(65) Prior Publication Data
US 2015/0289251 A1 Oct. 8, 2015

Related U.S. Application Data

(60) Provisional application No. 61/732,851, filed on Dec. 3, 2012.

(51) Int. Cl.
G08C 17/00 (2006.01)
H04B 1/12 (2006.01)
(Continued)

(52) U.S. Cl.
CPC ............. *H04B 1/12* (2013.01); *H04B 1/3827* (2013.01); *H04B 7/0452* (2013.01); *H04B 7/0617* (2013.01); *H04B 7/15557* (2013.01); *H04J 11/005* (2013.01); *H04J 11/0053* (2013.01); *H04L 1/0003* (2013.01); *H04L 1/0054* (2013.01); *H04L 1/1854* (2013.01);
(Continued)

(58) Field of Classification Search
CPC ...... H04W 72/04; H04W 76/04; H04W 52/02
See application file for complete search history.

(56) References Cited

U.S. PATENT DOCUMENTS

2007/0291719 A1 12/2007 Demirhan et al.
2011/0002281 A1 1/2011 Terry et al.
(Continued)

OTHER PUBLICATIONS

International Bureau of WIPO; International Preliminary Report on Patentability for PCT App. No. PCT/US2013/072886 dated Jun. 18, 2015; 9 pages.
(Continued)

*Primary Examiner* — Chi H Pham
*Assistant Examiner* — Fahmida Chowdhury
(74) *Attorney, Agent, or Firm* — Schwabe, Williamson & Wyatt, P.C.

(57) ABSTRACT

Methods and apparatus for communicating in a wireless network include mechanisms to facilitate concurrent use of periodic scheduling requests and a random access procedure for a UE to request uplink resources from an eNB.

15 Claims, 6 Drawing Sheets

(51) Int. Cl.

| | | |
|---|---|---|
| H04W 72/12 | (2009.01) |
| H04B 1/3827 | (2015.01) |
| H04W 84/18 | (2009.01) |
| H04W 92/18 | (2009.01) |
| H04W 72/04 | (2009.01) |
| H04L 5/00 | (2006.01) |
| H04W 36/10 | (2009.01) |
| H04W 52/40 | (2009.01) |
| H04W 76/04 | (2009.01) |
| H04J 11/00 | (2006.01) |
| H04W 72/08 | (2009.01) |
| H04W 76/02 | (2009.01) |
| H04W 52/02 | (2009.01) |
| H04L 1/00 | (2006.01) |
| H04W 24/02 | (2009.01) |
| H04L 25/02 | (2006.01) |
| H04B 7/0452 | (2017.01) |
| H04B 7/06 | (2006.01) |
| H04B 7/155 | (2006.01) |
| H04L 1/18 | (2006.01) |
| H04W 24/10 | (2009.01) |
| H04W 84/04 | (2009.01) |
| H04L 27/00 | (2006.01) |

(52) U.S. Cl.
CPC .......... *H04L 1/1867* (2013.01); *H04L 5/0007* (2013.01); *H04L 5/0048* (2013.01); *H04L 5/0053* (2013.01); *H04L 5/0055* (2013.01); *H04L 5/0057* (2013.01); *H04L 5/0058* (2013.01); *H04L 5/0092* (2013.01); *H04L 25/0202* (2013.01); *H04L 25/0206* (2013.01); *H04W 24/02* (2013.01); *H04W 24/10* (2013.01); *H04W 36/10* (2013.01); *H04W 52/0261* (2013.01); *H04W 52/40* (2013.01); *H04W 72/042* (2013.01); *H04W 72/0406* (2013.01); *H04W 72/048* (2013.01); *H04W 72/0486* (2013.01); *H04W 72/08* (2013.01); *H04W 72/082* (2013.01); *H04W 72/12* (2013.01); *H04W 72/121* (2013.01); *H04W 72/1242* (2013.01); *H04W 72/1247* (2013.01); *H04W 76/023* (2013.01); *H04W 76/046* (2013.01); *H04W 76/048* (2013.01); *H04W 84/18* (2013.01); *H04W 92/18* (2013.01); *H04L 27/0008* (2013.01); *H04W 72/1205* (2013.01); *H04W 84/042* (2013.01); *Y02B 60/50* (2013.01)

(56) References Cited

U.S. PATENT DOCUMENTS

| | | | | |
|---|---|---|---|---|
| 2012/0122465 | A1* | 5/2012 | Landstrom | H04W 72/1252 455/450 |
| 2012/0250662 | A1* | 10/2012 | Kuo | H04W 4/20 370/336 |
| 2015/0257049 | A1* | 9/2015 | Yavuz | H04W 8/20 455/436 |

OTHER PUBLICATIONS

International Search Report and Written Opinion mailed Mar. 28, 2014 from International Application No. PCT/US2013/072886.

Nokia Siemens Networks et al., "Muliplexing of Scheduling Request with ACK/NACK and/or CQI", R1-074879, 3GPP TSG-RAN WG1 Meeting #51, Jeju, Korea, Nov. 5-9, 2007.

3GPP TS 36213 V10.7.0 (Sep. 2012); "Technical Specification Group Radio Access Network; Evolved Universal Terrestrial Radio Access (E-UTRA); Physical layer procedures (Release 10)," 126 pages.

3GPP TS 36300 V10.8.0 (Jun. 2012); "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 192 pages.

3GPP TS 36321 V10.6.0 (Sep. 2012); "Technical Specification Group Radio Access Network; Evolved Universal Terrestrial Radio Access (E-UTRA); Medium Access Control (MAC) protocol specification (Release 10)," 53 pages.

3GPP TS 36331 V10.7.0 (Sep. 2012); "Technical Specification Group Radio Access Network; Evolved Universal Terrestrial Radio Access (E-UTRA); Radio Resource Control (RRC); Protocol specification (Release 10)," 304 pages.

\* cited by examiner

USE OF SCHEDULING REQUEST AND RANDOM ACCESS FOR LTE ADVANCED NETWORKS

CROSS REFERENCE TO RELATED APPLICATIONS

The present application is a national phase entry under 35 U.S.C. §371 of International Application No. PCT/US2013/072886, filed , Dec. 3, 2013, entitled "USE OF SCHEDULING REQUEST AND RANDOM ACCESS FOR LTE ADVANCED NETWORKS", designates the United States of America, which claims priority to U.S. Patent Application No. 61/732,851, filed Dec. 3, 2012, entitled "ADVANCED WIRELESS COMMUNICATION SYSTEMS AND TECHNIQUES." The the entire content and disclosures of which are hereby incorporated by reference in their entireties for all purposes, except for those sections, if any, that are inconsistent with this specification.

TECHNICAL FIELD

Embodiments described herein generally relate to the field of wireless communications and, more particularly, to methods and apparatus for requesting uplink resources in a wireless communication system.

BACKGROUND OF THE INVENTION

It is becoming more important to be able to provide telecommunication services to fixed and mobile subscribers as efficient and inexpensively as possible. Further, the increased use of mobile applications has resulted in much focus on developing wireless systems capable of delivering large amounts of data at high speed.

Battery life of user equipment operating in wireless networks has become a concern, and low power operating modes have been suggested for user equipment, for example when on standby. However, it is important to limit any negative impact on the user experience when implementing such low power modes.

BRIEF DESCRIPTION OF THE DRAWING

Aspects, features and advantages of embodiments of the present invention will become apparent from the following description of the invention in reference to the appended drawings in which like numerals denote like elements and in which.

DETAILED DESCRIPTION OF EMBODIMENTS

Illustrative embodiments of the present disclosure include, but are not limited to, methods, systems, and apparatuses for selection of acknowledgement signal timing in a wireless communication network.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

Figure 1:
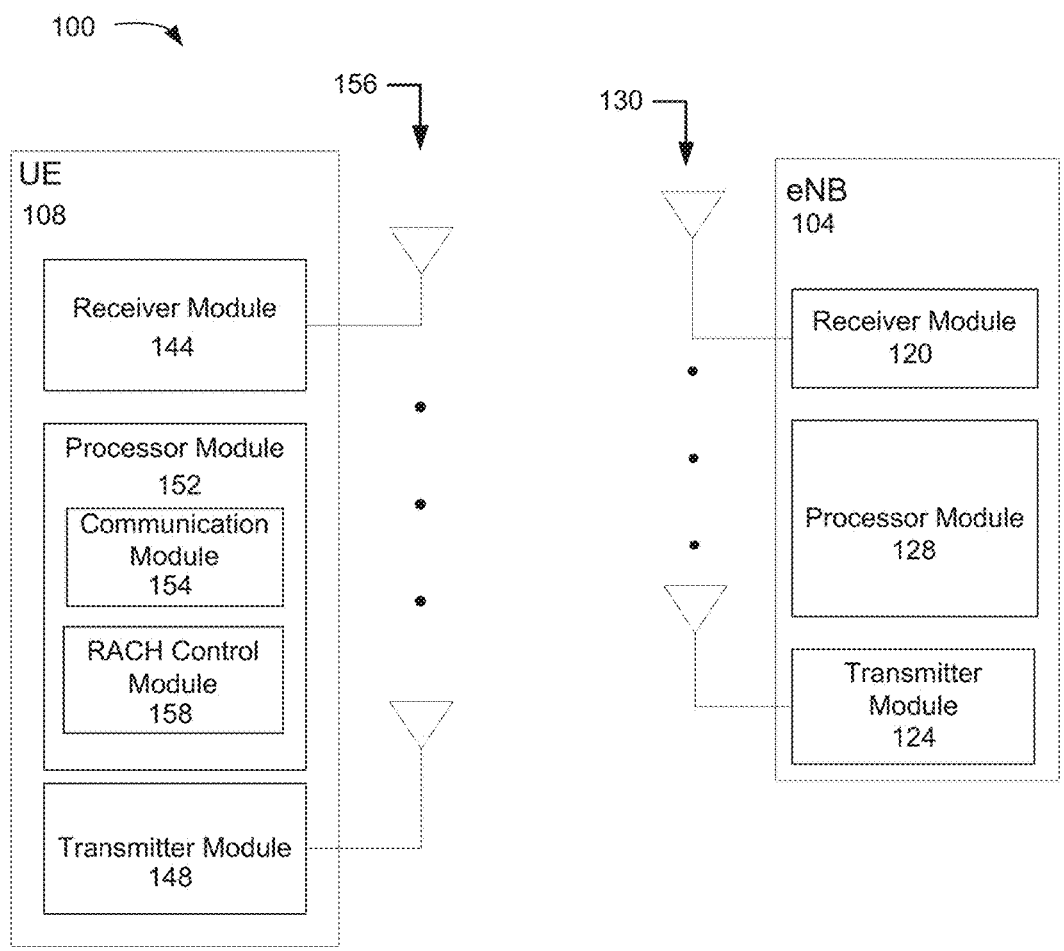
FIG. 1 is block diagram of an example wireless network according to various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) or long-term evolution-advanced (LTE-A) network such as an evolved universal mobile telecommunication system (UMTS) terrestrial radio access network (E-UTRAN).

The network 100 may include a base station, e.g., evolved node base station (eNB) 104, configured to wirelessly communicate with one or more mobile device(s) or terminal(s), e.g., user equipment (UE) 108. In various embodiments, the eNB 104 may be a fixed station (e.g., a fixed node) or a mobile station/node.

The eNB 104 may include a receiver module 120 with which to receive signals from UE 108 via one or more antennas 130. eNB 104 may include a transmitter module 124 with which to transmit signals to UE 108 via one or more antennas 130. eNB 104 may also include a processor module 128 in communication with receiver module 120 and transmitter module 124 and configured to encode and decode information communicated by the signals.

In various embodiments, the UE 108 and/or the eNB 104 may include a plurality of antennas 156, 130 to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO or variations of smart antenna processing.

In various embodiments, UE 108 comprises a transmitter module 148 for transmitting signals to eNB 104 and a receiver module 144 for receiving signals from the eNB 104. UE 108 further comprises a processor module 152 coupled between a receiver module 144 and a transmitter module 148 and including a communication module 154 to encode and decode information communicated by the signals. Processor module 152 also comprises RACH control module 158 to selectively control random access procedures performed by the UE 108 in accordance with embodiments described below.

While embodiments of the present invention are described with reference to an LTE network, some embodiments may be used with other types of wireless access networks.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

In order to request uplink resources, a User Equipment (UE) typically uses a scheduling request (SR). Scheduling Request (SR) is explained in 3GPP TS 36.213. A UE is configured by higher layers to transmit the scheduling request (SR) on the Physical Uplink Control Channel (PUCCH) resource. The SR configuration for SR transmission periodicity $SR_{PERIODICITY}$ and SR subframe offset $N_{OFFSET,SR}$ is defined in Table 10.1.5-1 of 3GPP TS 36.213 by the parameter sr-ConfigIndex $I_{SR}$ given by higher layers.

TABLE 1

| SR periods from TS 36.213 | | |
|---|---|---|
| SR configuration Index $I_{SR}$ | SR periodicity (ms) $SR_{PERIODICITY}$ | SR subframe offset $N_{OFFSET,SR}$ |
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

Alternatively, a random access procedure can be used at any time to request uplink resources. In an LTE system, the UE performs contention-based random access (RA) procedure to gain access to uplink resource. For this purpose, UEs use a specific uplink channel, called the physical random access channel (PRACH). The PRACH is a common transport channel that is used to register the terminal to the network after power-up, to perform location updates after moving from one location area to another, or to initiate a call by setting up a connection from the UE. Contention-based RA procedure consists of four steps as described in 3GPP TS 36.300 Section 10 and in 3GPP TS 36.321 Section 5. Each UE randomly picks a preamble signature and sends it using PRACH followed by the Random access response from the eNB providing uplink allocation resources for the UE to transmit uplink data packets.

However, if the UE has been allocated with periodic SRs, the use of the random access procedure by the user equipment has not been allowed by the network. Specifically, any attempt to initiate a random access procedure by the UE results in any pending SRs being cancelled by the network.

For relatively short scheduling request periods, for example up to 80 ms, there is no significant delay issue for new uplink packets that are forced to wait for the next periodic scheduling request. On average, the delay can be expected to be approximately 40 ms, which does not significantly impact a user experience.

However, assigning scheduling request allocations for a user equipment every 80 ms or less may create issues on the uplink control channel. In particular, in the case of background traffic, many SRs will be unused due to low activity of the UE and therefore frequent scheduling requests may be an inefficient use of network resources. To address this inefficiency, it has been suggested to provide for extended SR periods, for example, 100 ms, 200 ms, 400 ms, etc. However, such extended SR periods may result in noticeable delays in transmitting new uplink data packets to the network.

According to embodiments, when a UE is configured to use an extended SR period, such as for example a period greater than 80 ms, the UE is able to request uplink resources using the Random Access procedure on the physical random access channel (PRACH) without cancellation of the periodic SRs. Thus, rather than being forced to wait until the next scheduling request, the UE is able to begin requesting resources using the RA procedure as soon as uplink data packets are ready for transmission.

By allowing use of both SRs and the RA procedure concurrently by a UE, higher values of SR periodicity such as 100, 200, 400, 600, 1000, 2560 ms can be used without significantly increasing delays for new uplink packets. An example updated version of the table above with new SR configuration is shown in Table 2. Very long periodicities such as 1s and 2s may be used especially for Machine-Type- Communication (MTC) devices to allow a very large number of MTC devices to be connected to the network without significantly affecting the network performance.

TABLE 2

A sample change of new SR periodicity table configuration

| SR configuration Index $I_{SR}$ | SR periodicity (ms) $SR_{PERIODICITY}$ |
|---|---|
| 0-4 | 5 |
| 5-14 | 10 |
| 15-34 | 20 |
| 35-74 | 40 |
| 75-152 | 80 |
| 153 | 200 |
| 154 | 400 |
| 155-156 | 2 |
| 157 | 1 |

According to some embodiments, SR and RA can be used together by a UE if the device informs a connected eNB that it is operating in a low power mode via transmission of a Power Preference Indication (PPI) information element for lowpowerconsumption (power optimized).

According to embodiments, the UE is allowed to use SR and RA together when operating in discontinuous reception (DRX) mode and the DRX cycle of UE exceeds certain lengths, for example, if the LongDRX cycle or Short DRX-cycle value is greater than 500 ms.

Thus, instead of cancelling all pending SRs when a Random Access procedure is initiated on the primary cell, the pending SRs will be allowed as if the user is in a low power mode (i.e. PPI≠0) or long DRX cycles are enabled.

Figure 2:
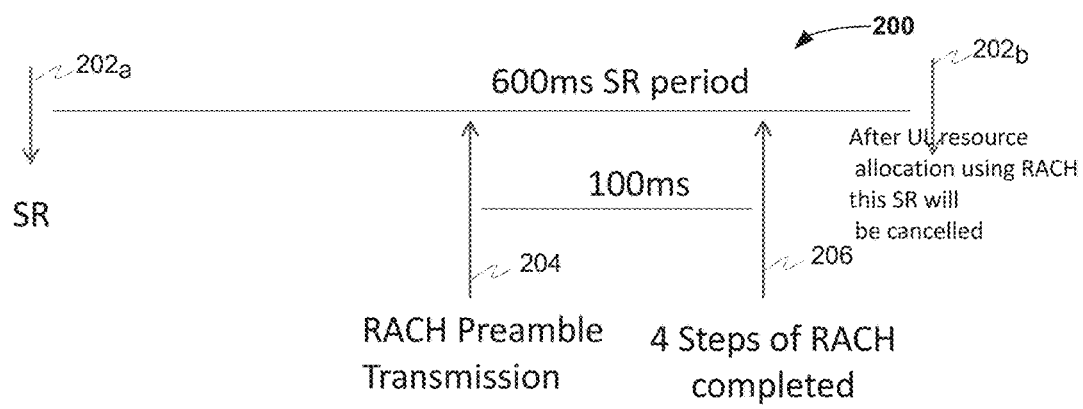
FIG. 2 is a timeline illustrating an exemplary method in a user equipment according to various embodiments.

FIG. 2 illustrates a timeline 200 between periodic SRs 202a, 202b for a UE wishing to be allocated uplink resources. In the example shown in FIG. 2, the SR period is a relatively long 600 ms and therefore significant delays may be experienced if the UE was required to wait until the next periodic SR allocation 202b before being allocated uplink resources. According to embodiments, the UE begins a RA procedure by transmitting a RACH preamble transmission 204. The RA procedure requires a certain period of time, for example 100 ms, until the UE receives an uplink resource allocation upon completion of the RA procedure 206. In some embodiments, the next, but not all, periodic SR may be cancelled once uplink resources have been allocated via the RA procedure.

Figure 3:
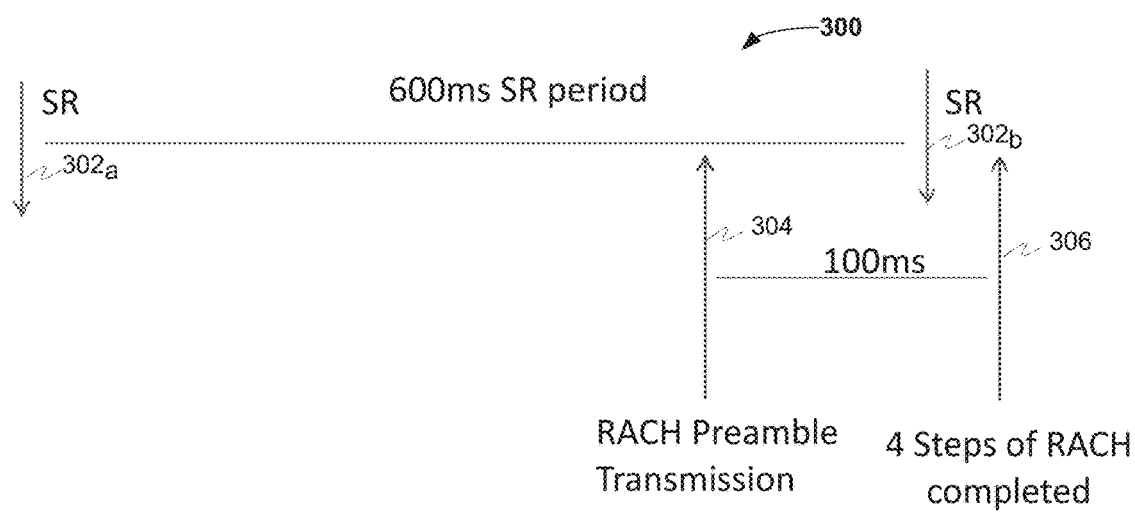
FIG. 3 is a timeline illustrating an exemplary method in a user equipment according to various embodiments.

In the timeline 300 illustrated in FIG. 3 UE starts the RA procedure 304 since its SR allocation 302b is not due for several milliseconds. However, the UE is unable to finish the RA procedure 306 before the next SR allocation 302b becomes available. Thus, the UE now has two uplink allocations for sending an SR instead of one. This results in unnecessary waste of uplink resources because both RA and SR have been used to ask for uplink resources.

Figure 4:
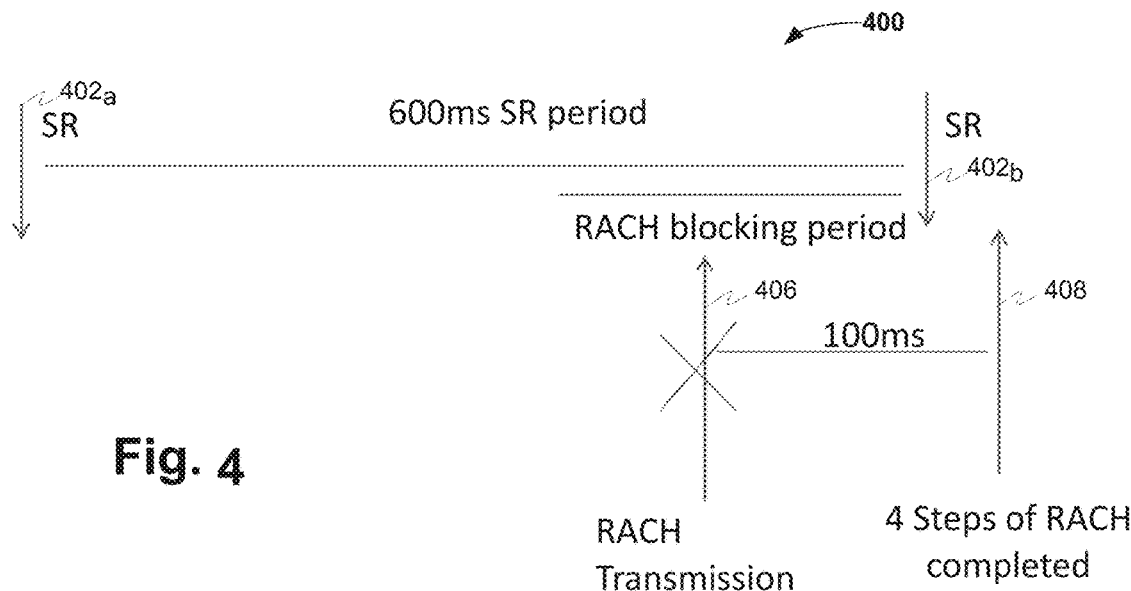
FIG. 4 is a further timeline illustrating an exemplary method in a user equipment according to various embodiments.

According to embodiments, this problem may be avoided by the arrangement illustrated in FIG. 4 through use of a RA blocking timer. The RA blocking timer will be provided by an eNB to connected UEs that are able to support concurrent use of SR and RA. When the eNB enables longer SR periodicities, for example 600 ms, then it will also enable the UE to use the RA procedure and provide a RA blocking timer value. The RA blocking timer is triggered only if the SR periodicity is greater than a predetermined value, for example 500 ms. Using the provided RA blocking timer value, the UE will not initiate an RA procedure for new uplink data packets if the time until the next SR allocation 402b is less than an RA blocking period 410 defined by the RA blocking timer value.

Thus, in the timeline 400 illustrated in FIG. 4, during the period between SR allocations 402a, 402b the UE determines that it has uplink packets to be transmitted. However, as the RACH transmission 406 using the RA procedure to request uplink resources would occur during the RA blocking period 410, the RA procedure is inhibited and the UE waits until the next SR allocation 402b.

Figure 5:
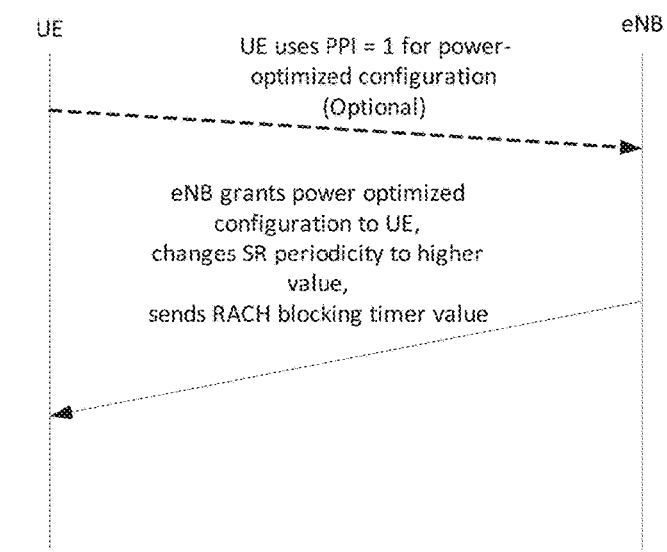
FIG. 5 is a sequence diagram illustrating communication between a user equipment and an eNB according to various embodiments.

The eNB can adaptively change the RA blocking timer value depending on the load on the RACH and the estimated success time of the RA procedure. UEs will not initiate the RA procedure if any uplink packets come while the RA blocking timer is running. Signaling of the RA prohibit timer is shown in FIG. 5. The signaling may be included as part of the RRCConnectionReconfiguration message used to send a power-optimized configuration to the UE.

Figure 6:
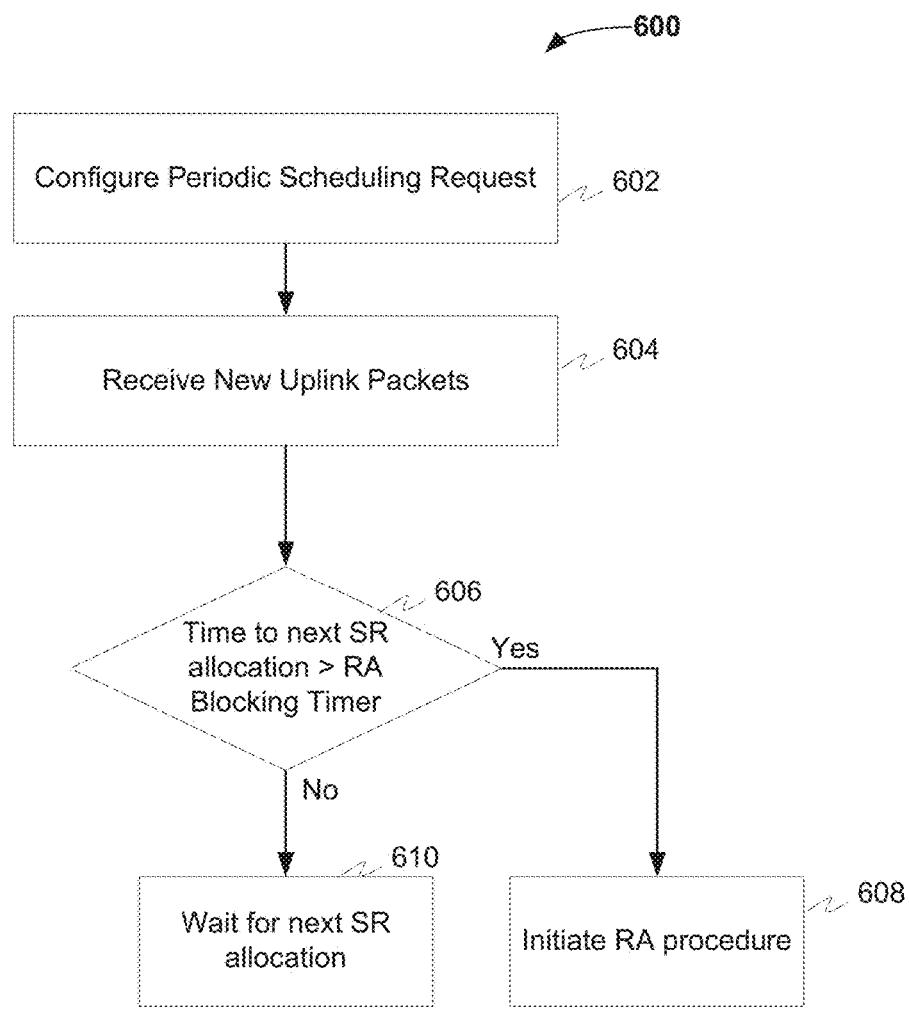
FIG. 6 is a block diagram showing an exemplary method in a user equipment in accordance with various embodiments.

FIG. 6 illustrates a method 600 performed by UE 108 according to embodiments. According to the method 600, the UE 108 configures a periodic scheduling request 602 with an eNB. Between scheduling request allocations, new packets to be transmitted on an uplink channel are received 604 at the UE. The UE 108 then determines 606 whether the time to the next periodic scheduled request is greater than an RA blocking timer received by the UE from the eNB 104, and if so the UE initiates an RA procedure 608 to request an uplink allocation. Otherwise, the UE waits for the next scheduled SR allocation to request uplink resources to transmit the uplink packets.

Figure 7:
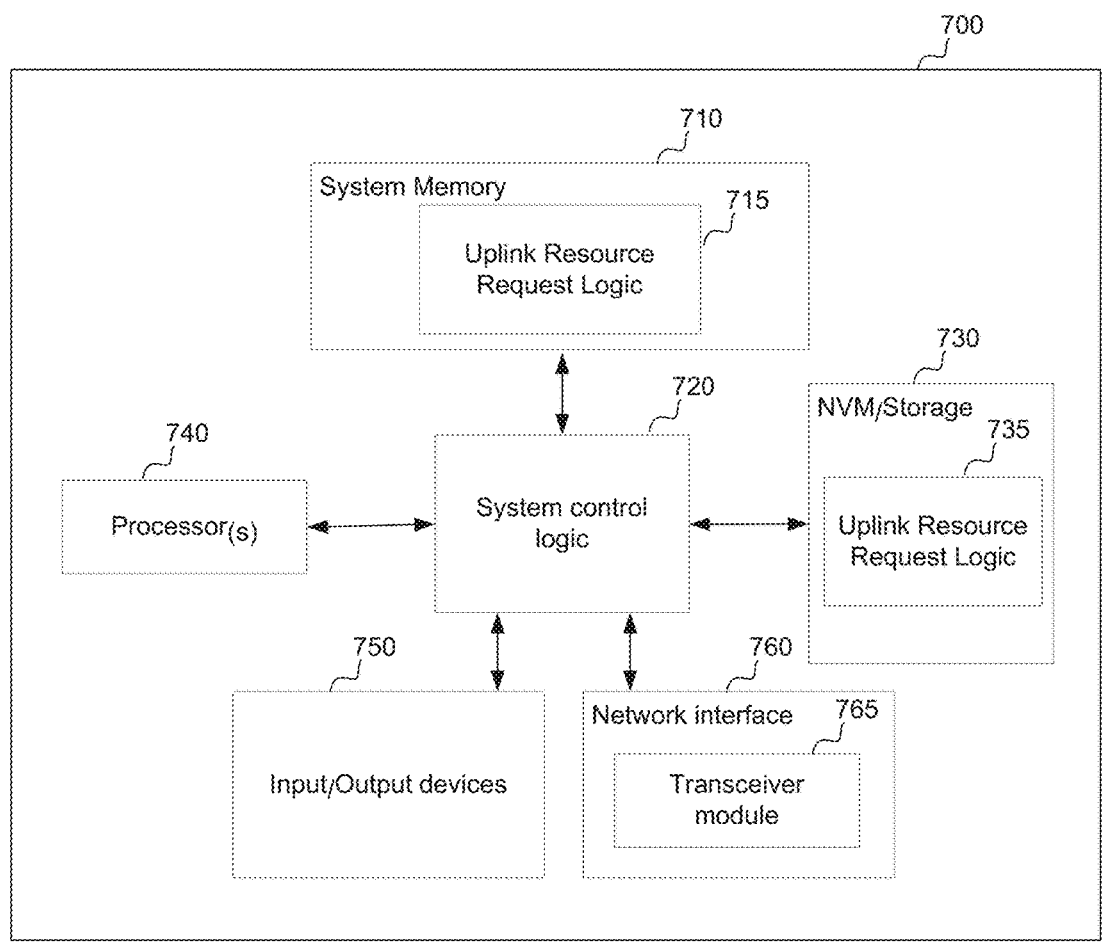
FIG. 7 is a block diagram showing an example system in accordance with various embodiments.

The eNBs 104 and UEs 108 described herein may be implemented into a system using any suitable hardware and/or software to configure as desired. FIG. 7 illustrates, for one embodiment, an example system 700 comprising one or more processor(s) 740, system control logic 720 coupled with at least one of the processor(s) 740, system memory 710 coupled with system control logic 720, non-volatile memory (NVM)/storage 730 coupled with system control logic 720, and a network interface 760 coupled with system control logic 720. The system control logic 720 may also be coupled to Input/Output devices 750.

Processor(s) 740 may include one or more single-core or multi-core processors. Processor(s) 740 may include any combination of general-purpose processors and dedicated processors (e.g., graphics processors, application processors, baseband processors, etc.). Processors 740 may be operable to carry out the above described methods, using suitable instructions or programs (i.e. operate via use of processor, or other logic, instructions). The instructions may be stored in system memory 710, as uplink resource request logic system memory portion 715, or additionally or alternatively may be stored in (NVM)/storage 730, as uplink resource request logic NVM instruction portion 735.

Processors(s) 740 may be configured to execute the embodiments of FIGS. 2-6 in accordance with various embodiments. In an embodiment in which the system 700 implements eNB 104, processor(s) 740 may be configured to transmit to the UE 108 an RA blocking timer value and/or with an indication to use both RA and SR procedures to request uplink resources.

System control logic 720 for one embodiment may include any suitable interface controllers to provide for any suitable interface to at least one of the processor(s) 740 and/or to any suitable device or component in communication with system control logic 720.

System control logic 720 for one embodiment may include one or more memory controller(s) (not shown) to provide an interface to system memory 710. System memory 710 may be used to load and store data and/or instructions, for example, for system 700. System memory 710 for one embodiment may include any suitable volatile memory, such as suitable dynamic random access memory (DRAM), for example.

NVM/storage 730 may include one or more tangible, non-transitory computer-readable media used to store data and/or instructions, for example. NVM/storage 730 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 730 may include a storage resource physically part of a device on which the system 700 is installed or it may be accessible by, but not necessarily a part of, the device. For example, the NVM/storage 730 may be accessed over a network via the network interface 760.

System memory 710 and NVM/storage 730 may respectively include, in particular, temporal and persistent copies of, for example, the uplink resource request logic instructions portions 715 and 735, respectively. Instructions portions 715 and 735 may include instructions that when executed by at least one of the processor(s) 740 result in the system 700 implementing method 600 or the method(s) of any other embodiment, as described herein. In some embodiments, instruction portions 715 and 735, or hardware, firmware, and/or software components thereof, may additionally/alternatively be located in the system control logic 720, the network interface 760, and/or the processor(s) 740.

Network interface 760 may have a transceiver module 765 to provide a radio interface for system 700 to communicate over one or more network(s) (e.g. wireless communication network) and/or with any other suitable device. In various embodiments, the transceiver 765 may be integrated with other components of system 700. For example, the transceiver 765 may include a processor of the processor(s) 740, memory of the system memory 710, and NVM/Storage of NVM/Storage 730. Network interface 760 may include any suitable hardware and/or firmware. Network interface 760 may be operatively coupled to a plurality of antennas to provide a multiple input, multiple output radio interface. Network interface 760 for one embodiment may include, for example, a network adapter, a wireless network adapter, a telephone modem, and/or a wireless modem.

For one embodiment, at least one of the processor(s) 740 may be packaged together with logic for one or more controller(s) of system control logic 720. For one embodiment, at least one of the processor(s) 740 may be packaged together with logic for one or more controllers of system control logic 720 to form a System in Package (SiP). For one embodiment, at least one of the processor(s) 740 may be integrated on the same die with logic for one or more controller(s) of system control logic 720. For one embodiment, at least one of the processor(s) 740 may be integrated on the same die with logic for one or more controller(s) of system control logic 720 to form a System on Chip (SoC).

In various embodiments, the I/O devices 750 may include user interfaces designed to enable user interaction with the system 700, peripheral component interfaces designed to enable peripheral component interaction with the system 700, and/or sensors designed to determine environmental conditions and/or location information related to the system 700.

Figure 8:
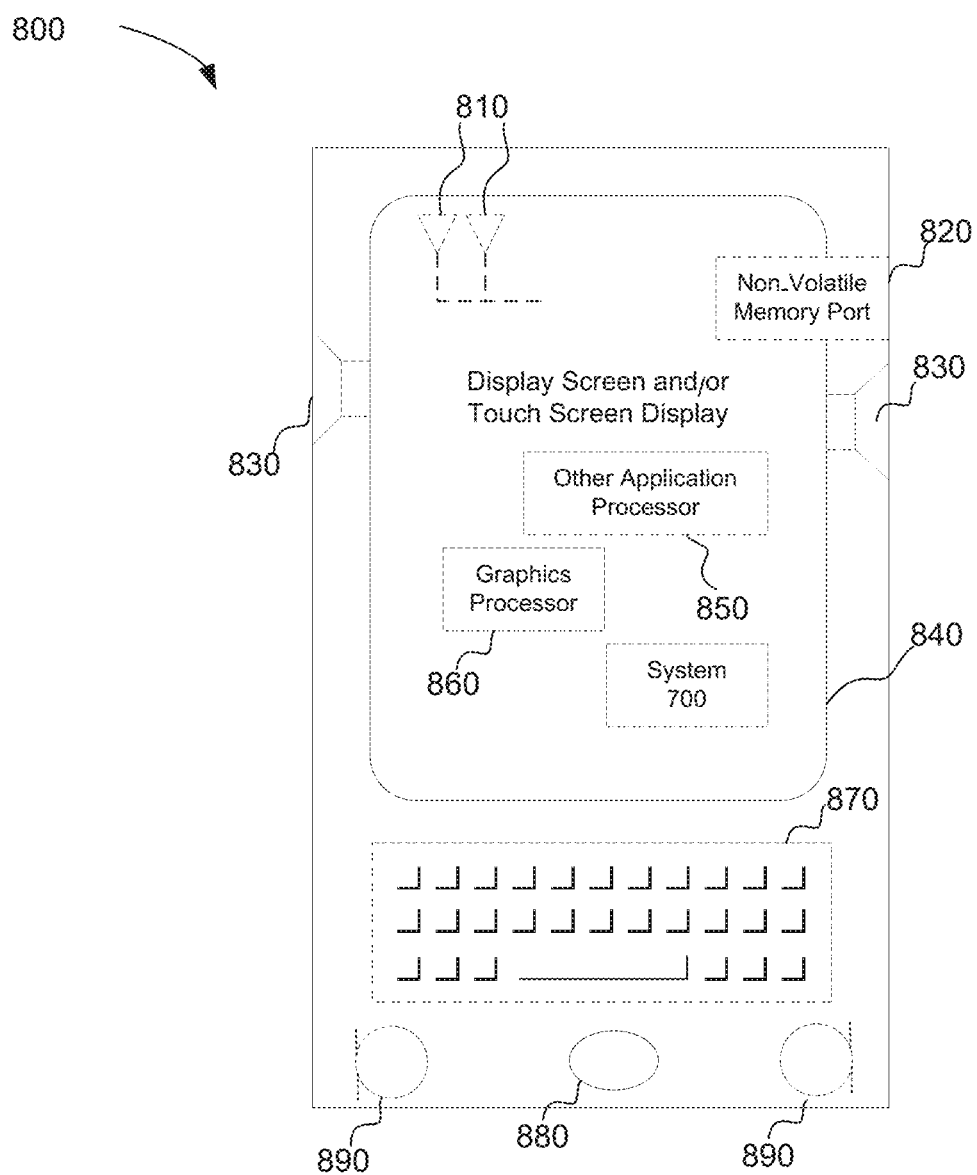
FIG. 8 is a block diagram showing an example wireless apparatus configured for communicating in a wireless network according to one or more of the inventive methods disclosed herein.

FIG. 8 shows an embodiment in which the system 700 implements a UE 108 in the specific form of a mobile device 800.

In various embodiments, user interfaces could include, but are not limited to, a display 840 (e.g., a liquid crystal display, a touch screen display, etc.), a speaker 830, a microphone 890, one or more cameras 880 (e.g., a still camera and/or a video camera), a flashlight (e.g., a light emitting diode flash), and a keyboard 870.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 760 to communicate with components of a positioning network, e.g., a global positioning system (GPS) satellite.

In various embodiments, the system 700 may be a mobile computing device such as, but not limited to, a laptop computing device, a tablet computing device, a netbook, a mobile phone, etc. In various embodiments, system 700 may have more or less components, and/or different architectures.

In embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

According to various embodiments, there is provided an apparatus comprising processing circuitry configured to generate a scheduling request (SR) for transmission to an eNB on a physical uplink control channel (PUCCH) with a predetermined periodicity, and initiate a Random Access procedure to request allocation of uplink resources while maintaining generation of scheduling requests with said predetermined periodicity.

According to various embodiments the processing circuitry is further configured to generate a Power Preference Indicator (PPI) information element indicating that the apparatus is operating in a low power consumption state.

According to various embodiments the processing circuitry is further configured to cause the apparatus to operate in a discontinuous reception (DRX) cycle exceeding approximately 500 ms.

According to various embodiments the apparatus further comprises a receiver module configured to receive a RA blocking timer from the eNB, wherein the circuitry is further configured to inhibit initiation of the Random Access procedure if the time to transmission of the next periodic scheduling request is less than the received RA blocking timer value.

According to various embodiments the predetermined periodicity is one of: 100 ms, 200 ms, 400 ms, 600 ms, 1000 ms, and 2560 ms.

According to various embodiments the apparatus further comprises a receive module operable to receive an RRCConnectionReconfiguration message from an eNB, the RRCConnectionReconfiguration message comprising the RA blocking timer value.

According to various embodiments there is provided an apparatus comprising means for generating a scheduling request (SR) for transmission to an eNB on a physical uplink control channel (PUCCH) with a predetermined periodicity, and means for initiating a Random Access procedure to request allocation of uplink resources while maintaining generation of scheduling requests with said predetermined periodicity.

According to various embodiments the apparatus further comprises one of: a System on a Chip, a chipset, a user equipment and a Machine-Type Communication (MTC) device.

According to various embodiments there is provided a user equipment including the apparatus of any described embodiment, and further comprising one or more of: a screen, a speaker, a touchscreen, a keyboard, an antenna array including a plurality of antennas, a graphics processor, or an application processor.

According to various embodiments there is provided a method of requesting uplink resources in a wireless communication network, the method comprising transmitting a periodic scheduling request (SR) to an eNB on a physical uplink control channel (PUCCH), the periodic scheduling request being transmitted with a first predetermined periodicity, and performing a random access (RA) procedure to request allocation of uplink resources while continuing to transmit the periodic scheduling request with said predetermined periodicity.

According to various embodiments the method further comprises receiving an RA blocking timer value from the eNB, and performing the random access procedure only if the time before transmission of the next periodic scheduling is greater than the received RA blocking timer value.

According to various embodiments receiving the RA blocking timer value further comprises receiving an RRCConnectionReconfiguration message from the eNB, the RRCConnectionReconfiguration message comprising the RA blocking timer value.

According to various embodiments the method further comprises receiving an indication from the eNB indicating that use of the random access procedure while continuing to transmit the periodic scheduling request is enabled by the eNB.

According to various embodiments performing the random access procedure comprises performing the random access procedure in response to identifying one or more uplink data packets to be transmitted to the eNB.

According to various embodiments performing the random access procedure while continuing to transmit the periodic scheduling request further comprises performing the random access procedure while continuing to transmit the periodic scheduling request in response to operation in a low power consumption state.

According to various embodiments performing the random access procedure while continuing to transmit the periodic scheduling request further comprises performing the random access procedure while continuing to transmit the periodic scheduling request in response to operation with a discontinuous reception (DRX) cycle exceeding 500 ms.

According to various embodiments there is provided a user equipment comprising, a processor, and a non-transient memory comprising computer program instructions that when executed on the processor cause the user equipment to perform the method of any embodiment described above.

According to various embodiments there is provided an eNB for use in a wireless communication system and comprising circuitry configured to determine that a UE connected to the eNB can support concurrent use of a scheduling request (SR) procedure and a random access (RA) procedure, upon determining that the UE supports concurrent use of SR and RA procedures, providing a RA blocking timer to the UE.

According to various embodiments the circuitry is further configured to enable SR periodicities for use by the UE of greater than 80 ms.

According to various embodiments the circuitry is further configured to generate an RRCConnectionReconfiguration message comprising the RA blocking timer for transmission to the UE.

According to various embodiments there is provided an eNB for use in a wireless communication system, the eNB comprising means for determining that a UE connected to the eNB can support concurrent use of a scheduling request (SR) procedure and a random access (RA) procedure, and means operable upon determining that the UE supports concurrent use of SR and RA procedures to provide an RA blocking timer to the UE.

According to various embodiments, the eNB may further comprise means for transmitting at least one of: the RA blocking timer and an indication to use both RA and SR procedures to the UE.

According to various embodiments there is provided a method of generating an RA blocking timer for transmission to a UE in a wireless communication network, the method comprising determining that a connected UE can support concurrent use of a scheduling request (SR) procedure and a random access (RA) procedure to request uplink resources determining a blocking timer value based on the load on a Random Access Channel (RACH) and an estimated time for completion of a Random Access procedure by the UE.

According to various embodiments the method further comprises transmitting an RRCConnectionReconfiguration message to the UE, the RRCConnectionReconfiguration message comprising the RA blocking timer value.

According to various embodiments there is provided a non-transient computer readable medium comprising computer program instructions that when executed on a processor cause the method of any described embodiment to be performed.

The invention claimed is:

1. An apparatus comprising:
memory circuitry having instructions; and
processing circuitry coupled with the memory circuitry to execute the instructions to:
generate a Power Preference Indicator (PPI) information element to indicate that the apparatus is to operate in a low-power consumption state;
generate a scheduling request (SR) for transmission to an eNB on a physical uplink control channel (PUCCH) with a predetermined periodicity; and
initiate, based on generation of the PPI information element, a Random Access procedure to request allocation of uplink resources while maintaining generation of scheduling requests with said predetermined periodicity.

2. An apparatus comprising:
memory circuitry having instructions; and
processing circuitry coupled with the memory circuitry to execute the instructions to:

generate a scheduling request (SR) for transmission to an eNB on a physical uplink control channel (PUCCH) with a predetermined periodicity;

initiate a Random Access procedure to request allocation of uplink resources while maintaining generation of scheduling requests with said predetermined periodicity; and cause the apparatus to operate in a discontinuous reception (DRX) cycle exceeding 500 ms.

3. The apparatus of claim 1, further comprising a receiver module to receive an RA blocking timer value from the eNB, and wherein the processing circuitry is further to inhibit initiation of the Random Access procedure if a time to transmission of the next periodic scheduling request is less than the received RA blocking timer value.

4. An apparatus comprising:
memory circuitry having instructions; and
processing circuitry coupled with the memory circuitry to execute the instructions to;
  initiate, during a first time period, a Random Access procedure to request allocation of uplink resources using a physical random access channel; and
  generate, during a second time period, a scheduling request (SR) for transmission to an eNB on a physical uplink control channel (PUCCH) with a predetermined periodicity, wherein the predetermined periodicity is one of: 100 ms, 200 ms, 400 ms, 600 ms, 1000 ms, and 2560 ms.

5. The apparatus of claim 3, wherein the receiver module is to receive an RRCConnectionReconfiguration message from the eNB, the RRCConnectionReconfiguration message comprising the RA blocking timer value.

6. The apparatus of claim 1, wherein the apparatus comprises a System on a Chip, a chipset, a user equipment or a Machine-Type Communication (MTC) device.

7. A user equipment comprising the apparatus of claim 1, further comprising one or more of: a screen, a speaker, a touchscreen, a keyboard, an antenna array including a plurality of antennas, a graphics processor, or an application processor.

8. One or more non-transitory, computer-readable media having instructions that, when executed, cause a device to:
  transmit a periodic scheduling request (SR) to an eNB on a physical uplink control channel (PUCCH), the periodic scheduling request to be transmitted with a first predetermined periodicity; and
  receive, in a radio resource control connection reconfiguration message, a random access (RA) blocking timer value from the eNB;
  perform a random access (RA) procedure to request allocation of uplink resources while continuing to transmit the periodic scheduling request with said predetermined periodicity only if a time before transmission of a next periodic scheduling is greater than the RA blocking timer value.

9. The one or more non-transitory, computer-readable media of claim 8, wherein the instructions, when executed, further cause the device to receive an indication from the eNB that use of the random access procedure while continuing to transmit the periodic scheduling request is enabled by the eNB.

10. The one or more non-transitory, computer-readable media of claim 8, wherein the instructions, when executed, further cause the device to perform the random access procedure in response to identifying one or more uplink data packets to be transmitted to the eNB.

11. One or more non-transitory, computer-readable media having instructions that, when executed, cause a device to:
  transmit a periodic scheduling request (SR) to an eNB on a physical uplink control channel (PUCCH), the periodic scheduling request to be transmitted with a first predetermined periodicity; and
  perform a random access (RA) procedure to request allocation of uplink resources while continuing to transmit the periodic scheduling request with said predetermined periodicity,
  wherein said performance of the random access procedure while continuing to transmit the periodic scheduling request is in response to operation in a low power consumption state.

12. The one or more non-transitory, computer-readable media of claim 8, wherein the instructions, when executed, further cause the device to perform the random access procedure while continuing to transmit the periodic scheduling request in response to operation with a discontinuous reception (DRX) cycle exceeding 500 ms.

13. An eNB for use in a wireless communication system and comprising:
memory circuitry having instructions; and
processing circuitry coupled with the memory circuitry to execute the instructions to:
  determine that a UE connected to the eNB can support concurrent use of a scheduling request (SR) procedure and a random access (RA) procedure;
  upon determining that the UE supports concurrent use of SR and RA procedures, provide an RA blocking timer to the UE; and
  enable SR periodicities for use by the UE of greater than 80 ms.

14. The eNB of claim 13, wherein the processing circuitry is further to generate an RRCConnectionReconfiguration message comprising the RA blocking timer for transmission to the UE.

15. One or more non-transitory, computer-readable media having instructions that, when executed, cause a device to:
  determine that a connected UE can support concurrent use of a scheduling request (SR) procedure and a random access (RA) procedure to request uplink resources; and
  determine a blocking timer value based on a load on a Random Access Channel (RACH) and an estimated time for completion of a Random Access procedure by the UE; wherein the instructions, when executed, further cause the device to transmit an RRCConnection-Reconfiguration message to the UE, the RRCConnectionReconfigurationmessage comprising the blocking timer value.

* * * * *